United States Patent
Choi et al.

(10) Patent No.: US 12,298,749 B2
(45) Date of Patent: May 13, 2025

(54) METHOD AND DEVICE FOR PREDICTING DEFECTS

(71) Applicant: SAMSUNG ELECTRONICS CO., LTD., Suwon-si (KR)

(72) Inventors: Taelim Choi, Seoul (KR); Jun Haeng Lee, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 401 days.

(21) Appl. No.: 17/748,241

(22) Filed: May 19, 2022

(65) Prior Publication Data
US 2023/0054159 A1 Feb. 23, 2023

(30) Foreign Application Priority Data
Aug. 23, 2021 (KR) .................. 10-2021-0110942

(51) Int. Cl.
*G05B 19/418* (2006.01)

(52) U.S. Cl.
CPC .......... *G05B 19/41875* (2013.01); *G05B 2219/32222* (2013.01)

(58) Field of Classification Search
None
See application file for complete search history.

(56) References Cited

U.S. PATENT DOCUMENTS

| | | |
|---|---|---|
| 7,873,585 B2 | 1/2011 | Izikson |
| 8,737,676 B2 | 5/2014 | Tsuchiya et al. |
| 10,031,997 B1 | 7/2018 | Chang et al. |
| 10,430,719 B2 | 10/2019 | David |
| 10,832,092 B2 | 11/2020 | Shaubi et al. |
| 10,908,513 B2 | 2/2021 | Noot et al. |
| 2008/0306621 A1* | 12/2008 | Choi .......... G05B 19/41875 700/110 |

(Continued)

FOREIGN PATENT DOCUMENTS

| | | | |
|---|---|---|---|
| CN | 112288128 | * | 1/2021 |
| KR | 10-2009-0002106 A | | 1/2009 |

(Continued)

OTHER PUBLICATIONS

Bromley, Jane, et al., "Signature Verification using a "Siamese" Time Delay Neural Network," Advances in neural information processing systems 6, 1993, (8 pages in English).

(Continued)

*Primary Examiner* — David Earl Ogg
(74) *Attorney, Agent, or Firm* — NSIP Law (57) ABSTRACT

A method and device for predicting a defect. The method includes determining a sequence between a plurality of sub-models by modeling a production process into the plurality of sub-models, mapping production process data into each of the plurality of sub-models, determining, by a corresponding sub-model, output data comprising defect information on a potential defect occurring in a corresponding step, for each of the plurality of sub-models, predicting information associated with a defect in the production process based on the output data corresponding to each of the plurality of sub-models, and inputting the output data of each of the sub-models to a subsequent sub-model of the corresponding sub-model, based on the sequence.

19 Claims, 8 Drawing Sheets

(56) References Cited

U.S. PATENT DOCUMENTS

| | | | |
|---|---|---|---|
| 2009/0063378 A1 | 3/2009 | Izikson | |
| 2010/0318934 A1* | 12/2010 | Blevins | G05B 13/048 |
| | | | 700/110 |
| 2013/0030760 A1* | 1/2013 | Ho | G06Q 10/04 |
| | | | 702/179 |
| 2015/0105887 A1* | 4/2015 | Troy | G05B 19/41865 |
| | | | 700/97 |
| 2016/0313651 A1* | 10/2016 | Middlebrooks | G03F 7/705 |
| 2019/0004504 A1* | 1/2019 | Yati | H01L 22/20 |
| 2020/0104639 A1 | 4/2020 | Didari et al. | |
| 2020/0226420 A1 | 7/2020 | Shaubi et al. | |
| 2020/0294224 A1* | 9/2020 | Shaubi | G06V 20/69 |
| 2021/0073646 A1* | 3/2021 | Junginger | G06N 3/084 |
| 2022/0188943 A1* | 6/2022 | Krug | G06F 30/20 |

FOREIGN PATENT DOCUMENTS

| | | | | |
|---|---|---|---|---|
| KR | 10-2012-0117045 A | 10/2012 | | |
| KR | 10-2017-0024262 A | 3/2017 | | |
| KR | 10-2017-0060186 A | 5/2017 | | |
| KR | 10-2017-0125238 A | 11/2017 | | |
| KR | 10-2020-0126080 A | 11/2020 | | |
| WO | WO 2019/155471 A1 | 8/2019 | | |
| WO | WO-2021075927 A1 * | 4/2021 | | G05B 23/0283 |

OTHER PUBLICATIONS

Szegedy, Christian, et al., "Going Deeper with Convolutions", Proceedings of the IEEE conference on computer vision and pattern recognition, 2015, (9 pages in English).

* cited by examiner

METHOD AND DEVICE FOR PREDICTING DEFECTS

CROSS-REFERENCE TO RELATED APPLICATIONS

This application claims the benefit under 35 USC § 119(a) of Korean Patent Application No. 10-2021-0110942, filed on Aug. 28, 2021, in the Korean Intellectual Property Office, the entire disclosure of which is incorporated herein by reference for all purposes.

BACKGROUND

1. Field

The following description relates to a method and device for predicting a potential defect that may occur in a product production process.

2. Description of Related Art

When a single product is produced through a series of processes including a plurality of steps, ensuring integrity and reliability based on a systematic connection in each process may be extremely important. To achieve such integrity, an efficient quality control system that inspects an imported component, determines whether a defect is present or absent in each production process, and identifies a cause of the defect in a production process may need to be developed.

Recently, to improve operating speed of a semiconductor chip and information storage capacity per unit area, a minimum line width applied to a semiconductor integrated circuit process is being employed increasingly less often in the semiconductor manufacturing industry. In addition, a size of a semiconductor device (e.g., a transistor) integrated on a semiconductor wafer may be reduced to a sub-half micron or less. For example, a critical dimension (CD) of the semiconductor device, a process speed, and a feature size that are of greater importance to a process of the semiconductor device may decrease, and a size of a substrate may increase. Thus, the decreased feature size due to an increase in an integration of the semiconductor device, and the increased size of the substrate for manufacturing the semiconductor device may become a burden on the semiconductor manufacturing process.

Such semiconductor device may be manufactured through a deposition process, a photolithography process, an etching process, and a diffusion process, and such processes may need to be repeated up to tens of times for manufacturing. In addition, numerous variables affecting a result of each process may be present.

For example, in the photolithography process, various process parameters such as resolution, depth of focus, and overlay being equal to or greater than a preset level may need to be used for a photoresist formed on a wafer. In addition to an exposure device being controlled (e.g., focal length, temperature, etc.) and a surrounding environment, the resolution, the depth of focus, and the overlay may be determined based on resources of the exposure device, such as a refractive index of the photoresist formed on the wafer, a wavelength of the incident light, and an aperture ratio of the lens through which the incident light is reduced and projected. Thus, such process parameters may be combined with each other and appear in the photolithography process, which may significantly influence a result of the photolithography process.

The result of the photolithography process may be obtained in image form by precisely measuring electrically or optically using an electron microscope or an optical microscope such as a scanning electron microscope (SEM) or a transmission electron microscope (TEM) that enlarges and projects a surface on which the photolithography process is completed and the surface and a part of the wafer on which an etching process is completed after the photolithography process. The process parameters including the resolution, the depth of focus, and the overlay may be tracked through a result of the photolithography process in image form. For example, dozens of process variables may be tracked through the result of the photolithography process.

Thus, in related art, a system for managing semiconductor production equipment may manage whether a defect is present or absent in a process through a univariate management method in which measured values correspond to set values of a plurality of process variables one-to-one, the values being tracked through a result of the process in which the corresponding unit process is completed, and the system may include, in a subsequent unit process, a process variable in a normal state to provide feedback. Here, the univariate management method may manage only a unit process, and thus research and development on methods of managing a multivariate statistical process considering a correlation between unit processes in a sequence are being actively conducted.

A wafer may be manufactured to form approximately 500 or more chip patterns, and a precision inspection for detecting a defect may be performed at approximately 20 to 30 points of the wafer on which the photolithography process is completed. The precision inspection may need a great amount of time.

Thus, when the precision inspection is performed on all wafers on which the photolithography process is completed, productivity may decrease, which is why the precision inspection may be performed regularly for the number of wafers on which the photolithography process is completed, or for one wafer which may be randomly selected from among a plurality of wafers. For example, in a case of a batch type in which a semiconductor manufacturing process is performed in a cassette or a carrier with approximately 25 wafers in one lot unit, one wafer may be extracted from one lot and subjected to the precision inspection.

However, in the semiconductor process, a great amount of time may be needed for measuring such that some variables are frequently skipped based on a skip rule without each lot being measured to maximize production quantity.

Thus, in related art, the semiconductor manufacturing equipment management system being managed under the statistical process management method may have lower reliability because only the lot in which all variables are measured may be managed and partially measured lots may not be readily managed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a defect prediction method includes determining a sequence between a plurality of sub-models by modeling a production process into the plurality of sub-models, mapping production process data into each of the plurality of sub-models, determining, by a corresponding sub-model, output data including defect information on a potential defect occurring in a corresponding step, for each of the plurality of sub-models, and predicting information associated with a defect in the production process based on the output data corresponding to each of the plurality of sub-models. The output data of each of the sub-models is input to a subsequent sub-model of the corresponding sub-model, based on the sequence.

The method may further include obtaining the production process data.

The production process data may include any one of or any combination of first data measured as the production process is performed, second data processed based on the first data, and third data measured to determine whether a defect is present.

The determining of the output data may further include receiving previous output data of a previous sub-model of the corresponding sub-model, and determining the output data of the corresponding sub-model based on the previous output data and the production process data of the corresponding sub-model.

The determining of the output data of the corresponding sub-model may further include predicting third data of the corresponding sub-model based on the previous output data, first data of the corresponding sub-model, and second data of the corresponding sub-model, and determining final third data based on the predicted third data and measured third data.

The determining of the final third data may further include determining the measured third data to be the final third data in response to the measured third data being present, and determining the predicted third data to be the final third data in response to the measured third data being absent.

The determining of the output data of the corresponding sub-model may further include generating latent space information of the sub-model based on the previous output data, the first data of the corresponding sub-model, and the second data of the corresponding sub-model, and determining the output data based on any one of or any combination of the first data of the corresponding sub-model and the second data of the corresponding sub-model, the final third data, and the latent space information.

The mapping of the production process data into each of the plurality of sub-models may include dividing the production process data based on steps.

The determining of the sequence may include determining the sequence between the plurality of sub-models based on any one of or any combination of a temporal order and a physical correlation of the production process.

In another general aspect, a defect prediction device includes a processor. The processor may determine a sequence between a plurality of sub-models by modeling a production process into the plurality of sub-models, map production process data into each of the plurality of sub-models, determine, by a corresponding sub-model, output data including defect information on a potential defect occurring in a corresponding step, for each of the plurality of sub-models, and predict information associated with a defect in the production process based on the output data corresponding to each of the plurality of sub-models. The output data of each of the sub-models may be input to a subsequent sub-model of the corresponding sub-model, based on the sequence.

The processor may obtain the production process data.

The production process data may include any one of or any combination of first data measured as the production process is performed, second data processed based on the first data, and third data measured to determine whether a defect is present.

The processor may receive previous output data of a previous sub-model of the corresponding sub-model, and determine the output data of the corresponding sub-model based on the previous output data and the production process data of the corresponding sub-model.

The processor may predict third data of the corresponding sub-model based on the previous output data, the first data of the corresponding sub-model, and the second data of the corresponding sub-model, and determine final third data based on the predicted third data and measured third data.

The processor may determine the measured third data to be the final third data in response to the measured third data being present, and determine the predicted third data to be the final third data in response to the measured third data being absent.

The processor may generate latent space information of the corresponding sub-model based on the previous output data, the first data of the corresponding sub-model, and the second data of the corresponding sub-model, and determine the output data based on any one of or any combination of the first data of the corresponding sub-model and the second data of the corresponding sub-model, the final third data, and the latent space information.

The processor may divide the production process data based on steps.

The processor may determine the sequence between the plurality of sub-models based on any one of or any combination of a temporal order and a physical correlation of the production process.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following structural or functional descriptions of examples are merely intended for the purpose of describing the examples and the examples may be implemented in various forms. The examples are not meant to be limited, but it is intended that various modifications, equivalents, and alternatives are also covered within the scope of the claims.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It should be noted that if it is described that one component is "connected", "coupled", or "joined" to another component, a third component may be "connected", "coupled", and "joined" between the first and second components, although the first component may be directly connected, coupled, or joined to the second component. On the contrary, it should be noted that if it is described that one component is "directly connected", "directly coupled", or "directly joined" to another component, a third component may be absent. Expressions describing a relationship between components, for example, "between", directly between", or "directly neighboring", etc., should be interpreted to be alike.

The singular forms "a", "an", and "the" are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

The examples may be implemented as various types of products such as, for example, a personal computer (PC), a laptop computer, a tablet computer, a smart phone, a television (TV), a smart home appliance, an intelligent vehicle, a kiosk, and a wearable device. Hereinafter, examples will be described in detail with reference to the accompanying drawings. When describing the examples with reference to the accompanying drawings, like reference numerals refer to like components and a repeated description related thereto will be omitted.

Figure 1:
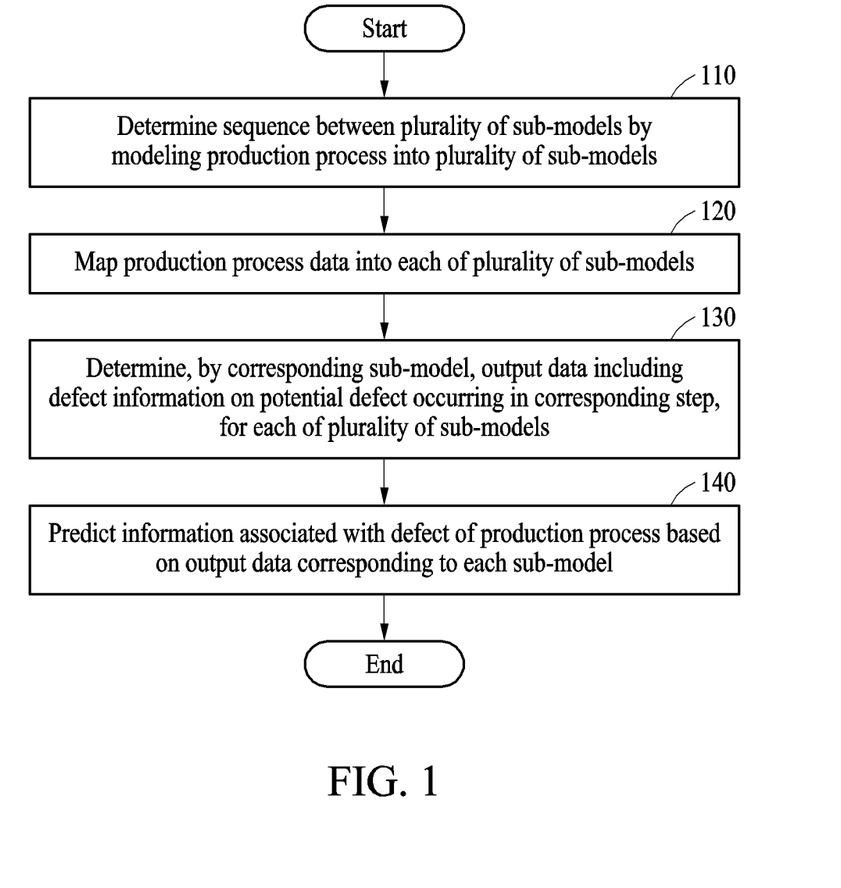
FIG. 1 illustrates an example of a method of predicting a potential defect that may occur in a product production process.

FIG. 1 illustrates an example of a method of predicting a potential defect that may occur in a product production process.

Referring to FIG. 1, operations 110 through 140 may be performed by a device for predicting a defect, hereinafter simply a defect prediction device. The defect prediction device may be implemented by one or more hardware modules, one or more software modules, or various combinations thereof. The operations in FIG. 1 may be performed in the sequence and manner as described herein. However, the order of some operations may be changed, or some of the operations may be omitted, without there being any departure from the spirit and scope of the illustrative examples described. The operations in FIG. 1 may be performed in parallel or simultaneously.

The defect prediction device may be used for modeling all production processes that may obtain information associated with an ongoing state using a measurement obtained halfway between an entire process. For the convenience of description, only a defect prediction method used in a semiconductor production process is described as an example herein. However, the defect prediction method may be applied to various production processes, in addition to the semiconductor production process.

To be described in detail hereinafter, the defect prediction device may define a detailed process having an intermediate measurement result as a sub-model having a pair of an input value and an output value, and an entire process may be represented as one predictive model through a relationship between sub-models. In order to identify or determine an issue in a production process, the defect prediction device may also predict a defect rate of the entire process using a prediction value through machine learning, even for a unit of production in which data obtained by a separate equipment is missing.

In operation 110, a defect prediction device may model a production process using a plurality of sub-models to determine a sequence between the plurality of sub-models. In an example, the defect prediction device may model the product production process that is completed through various processes using the plurality of sub-models.

For example, the defect prediction device may model a semiconductor production process including a deposition process, a photolithography process, an etching process, and a diffusion process using the plurality of sub-models. Hereinafter, a method of modeling a production process using a plurality of sub-models will be described with reference to FIG. 2.

Figure 2:
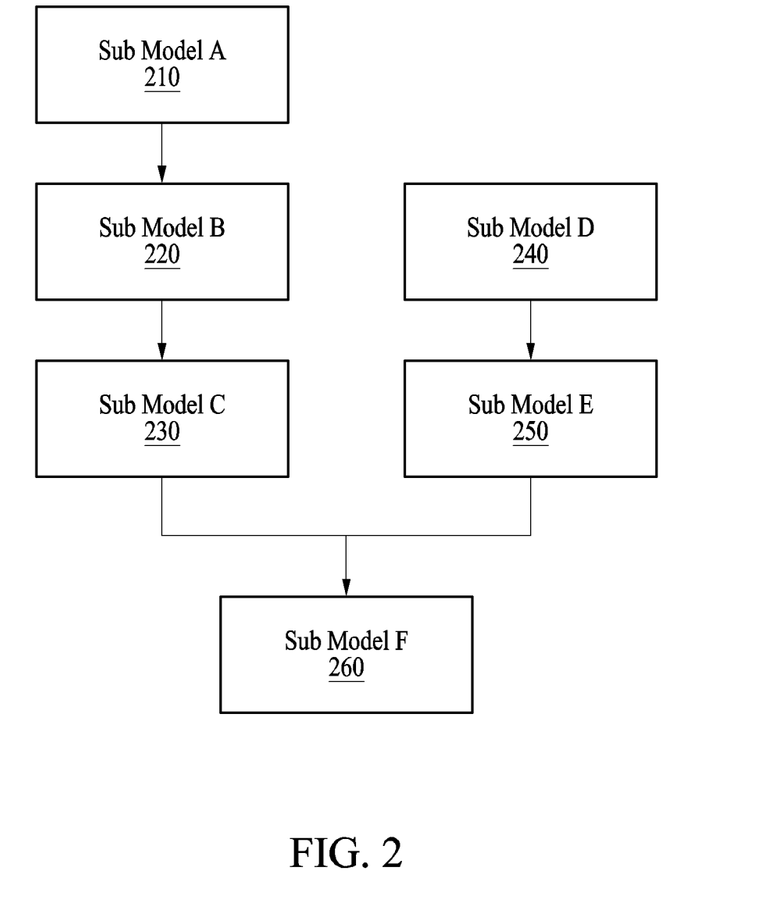
FIG. 2 illustrates an example of a method of modeling a production process using a plurality of sub-models.

Referring to FIG. 2, a defect prediction device may determine a sequence between a plurality of sub-models by modeling a production process using the plurality of sub-models. That is, the defect prediction device may dispose sub-models 210 through 260 representing a part of the process in a various manner based on a temporal order or a physical correlation of an actual production process.

Here, a step may be defined as a group (or set) of one or more of detailed processes determined by considering whether data is present, and the defect prediction device may model one step as one sub-model. For example, a process may include processes 1 through 10, and step 1 may include processes 1 and 2, step 2 may include process 3, step 3 may include processes 4 and 5, step 5 may include process 6, step 5 may include processes 7 and 8, and step 6 may include processes 9 and 10.

Here, under an assumption that steps 1, 2, and 3 are sequentially performed, steps 4 and 5 are sequentially performed, and step 6 is performed based on a result of the steps 1, 2, and 3 and a result of the steps 4 and 5, the defect prediction device may model step 1 to a sub-model A 210, step 2 to a sub-model B 220, step 3 to a sub-model C 230, step 4 to a sub-model D 240, step 5 to a sub-model E 250, and step 6 to the sub-model F 260.

Referring back to FIG. 1, in operation 120, the defect prediction device may map production process data to each of the sub-models. The production process data may include first data measured as the production process is performed, second data processed based on sensor data, and third data measured to determine whether a defect is present.

The sensor data may be, for example, real time data or a summary value of the real-time data from an equipment sensor in a detailed process needed for production (e.g., pressure in an etching chamber and operating speed of a motor). The second data may be processed based on the first data to monitor the detailed process (e.g., spectrum value of a plasm). The third data may be obtained by a separate piece of equipment (e.g., an electron microscope) to identify or determine an issue in the production process (e.g., a circuit line width, an etch depth, etc.) at a location measured using an electron microscope.

The third data may be used to determine whether a final defect is present, and as more third data is measured, an accuracy of determining whether the final defect is present may be improved. However, a great amount of third data being measured may cause lower productivity. Thus, a defect prediction method may increase efficiency of final defect determination by further using prediction of the third data as well as measurement of the third data.

The defect prediction device may in advance map the production process data to each of the sub-models. Hereinafter, a method of mapping production process data to each of the sub-models is described with reference to FIG. 3.

Figure 3:
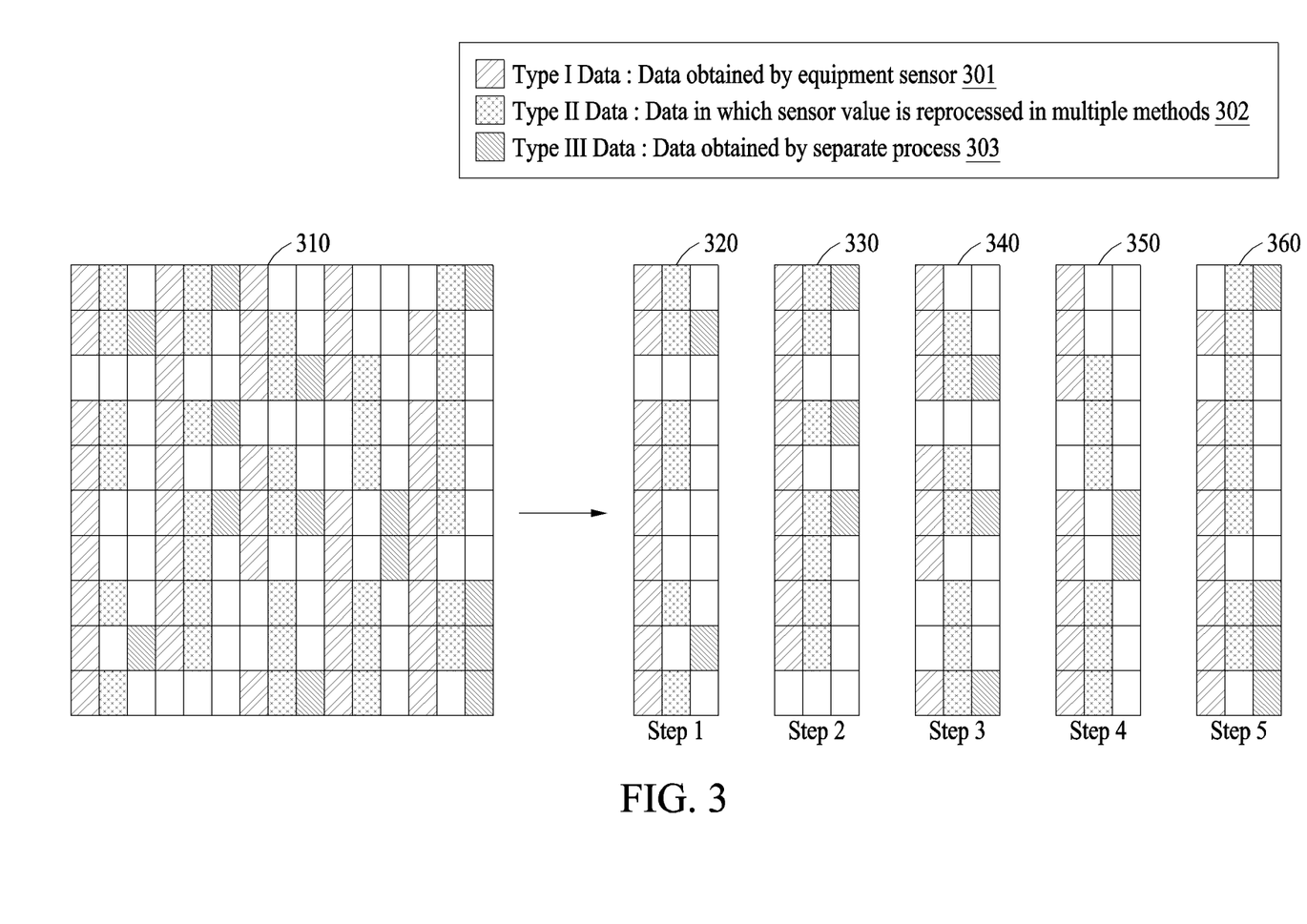
FIG. 3 illustrates an example of a method of mapping production process data into each of a plurality of sub-models.

Referring to FIG. 3, a defect prediction device may separate production process data 310 based on steps. A production process may have five process steps, and the defect prediction device may obtain production process data 310 for an entire production process.

In an example, an x-axis may indicate time, and a y-axis may indicate a production unit in the production process data 310. A blank box in the production process data 310 may indicate that data is absent at a time and a production unit.

The defect prediction device may separate and distribute the production process data 310 into data 320 in step 1, data 330 in step 2, data 340 in step 3, data 350 in step 4, and data 360 in step 5. The sets of data 320 through 360 distributed at each step may include first data 301, second data 302, and third data 303 corresponding to each step.

Referring back to FIG. 1, in operation 130, for each of the plurality of sub-models, a sub-model may determine output data including defect information on a potential defect occurring in a step.

In operation 140, the defect prediction device may predict information associated with a defect in the production process based on output data corresponding to each of the plurality of sub-models. Each of the plurality of sub-models may predict third data in a current step using data obtained from one or more previous sub-models as an input. That is, the output data for each of the plurality of sub-models may be inputted to a subsequent sub-model based on a sequence. Thus, as result values of the sub-models influence a sub-model in a subsequent step or a previous step, the defection prediction method may predict the defect by reflecting a correlation in the production process.

Figure 4:
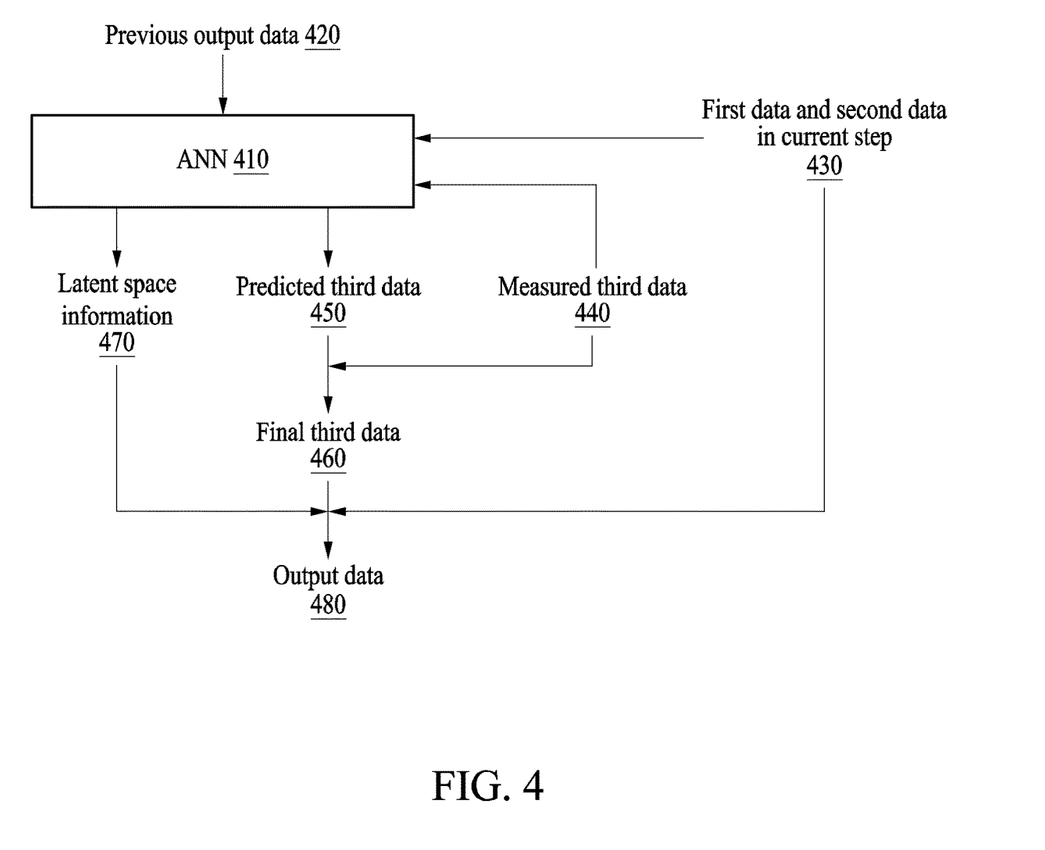
FIG. 4 illustrates an example of a method of determining output data of a sub-model.

FIG. 4 illustrates an example of a method of determining output data of a sub-model.

Referring to FIG. 4, a sub-model may include an artificial neural network (ANN) 410. The ANN 410 may include an input layer, an output layer, and optionally, one or more of hidden layers. Each layer may include one or more of neurons, and the ANN 410 may include neurons and synapses connecting neurons. Each neuron in the ANN 410 may output a function value from an activation function for input signals, weights, and biases input through the synapses.

A model parameter may be determined through training and include a weight of a synaptic connection or a bias of a neuron. In addition, a hyperparameter may be need to be set before a machine learning algorithm is trained and include a learning rate, a number of repetitions, a mini-batch size, an initialization function, and the like.

The ANN 410 may be trained to determine the model parameter minimizing a loss function. The loss function may be determined as an index to determine an optimal model parameter in a training process of the ANN 410.

The ANN 410 of the sub-model may receive previous output data 420. The previous output data 420 may be from a previous sub-model of the sub-model. The sub-model may determine output data 480 of the sub-model based on the previous output data 420 and the production process data of the sub-model.

That is, the ANN 410 of the sub-model may predict third data of the sub-model based on the previous output data 420 and first data and second data 430 of the sub-model. The ANN 410 may be trained using measured third data 440 of the sub-model.

Parameters of the ANN 410 may be trained such that a difference between predicted third data 450 and the measured third data 440, which is an output of the ANN 410, is minimized. An operation of training the ANN 410 may be performed in a separate server device. The server device may use previously prepared training data or training data collected from at least one user. In addition, the server device may use the training data generated by a simulation.

The ANN 410 may further output latent space information 470 of the sub-model based on the previous output data 420 and the first data and the second data 430 of the sub-model.

The sub-model may generate final third data 460 based on the measured third data 440 and the predicted third data 450. When the third data 440 measured in a production unit is present, the sub-model may determine the measured third data 440 to be the final third data 460 of the production unit. In contrast, when the third data 440 measured in the production unit is absent, the sub-model may determine the predicted third data 450 to be the final third data 460 of the production unit.

For example, when the third data is a line width of a circuit, circuit line width data corresponding to 20% of a total production unit may be obtained through a measurement, and circuit line width data corresponding to the remaining 80% may be obtained by a prediction using the ANN 410.

The sub-model may generate output data 480 based on any one or any combination of the first data and the second data 430, the final third data 460, and the latent space information 470 of the sub-model. The output data 480 of the sub-model may be used as input data of a subsequent sub-model based on a sequence. By using such structure, an entire process may be represented as one predictive model, and all data including when the third data is present or absent may be used for training.

Figure 5:
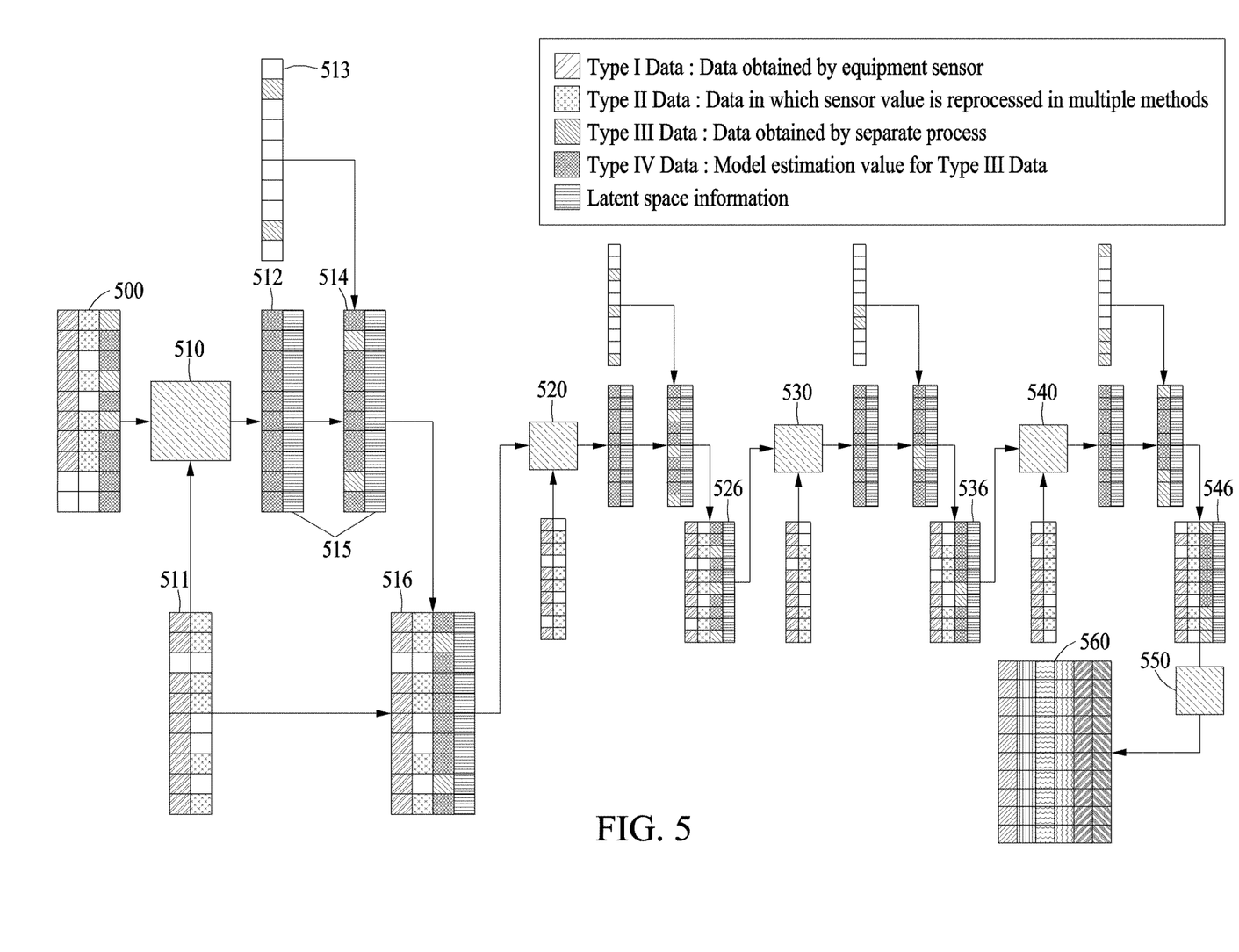
FIG. 5 illustrates an example of operations of sub-models for predicting a defect in a production process.

FIG. 5 illustrates an example of operations of sub-models for predicting a defect in a production process.

Referring to FIG. 5, a production process may include six steps that have a correlation with only a previous step and a subsequent step (an operation in step 1 is omitted in FIG. 5).

In step 2, a second sub-model 510 may receive output data 500 in step 1, first data and second data 511 in step 2, and thus predicted third data 512 and latent space information 515 may be generated. The second sub-model 510 may then determine final third data 514 using third data 513 and the predicted third data 512 in step 1, and output data 516 in step 2 may be determined based on the first data and second data 511, the final third data 514, and the latent space information 515.

Similarly, a third sub-model 520 in step 3 may receive the output data 516 in step 2 and determine output data 526 in step 3. A fourth sub-model 530 in step 5 may receive the output data 526 in step 4 and determine output data 536 in step 4. A fifth sub-model 540 in step 5 may receive the output data 536 in step 4 and determine output data 546 in step 5.

A sixth sub-model 550 in a final step, or step 6, may receive the output data 546 in step 5 and output final information 560 associated with a defect in the production process. The sixth sub-model 550 may determine the final information 560 by reflecting all sets of output data 500, 516, 526, 536, and 546 for each of the first sub-model and second through fifth sub-models 520 through 550. The final information 560 may include, for example, a type of the defect and a probability of a potential defect from occurring.

The defect prediction device may predict the final information 560 associated with the defect and at the same time, predict third data in each step for which originally a separate measurement process was needed.

Figure 6:
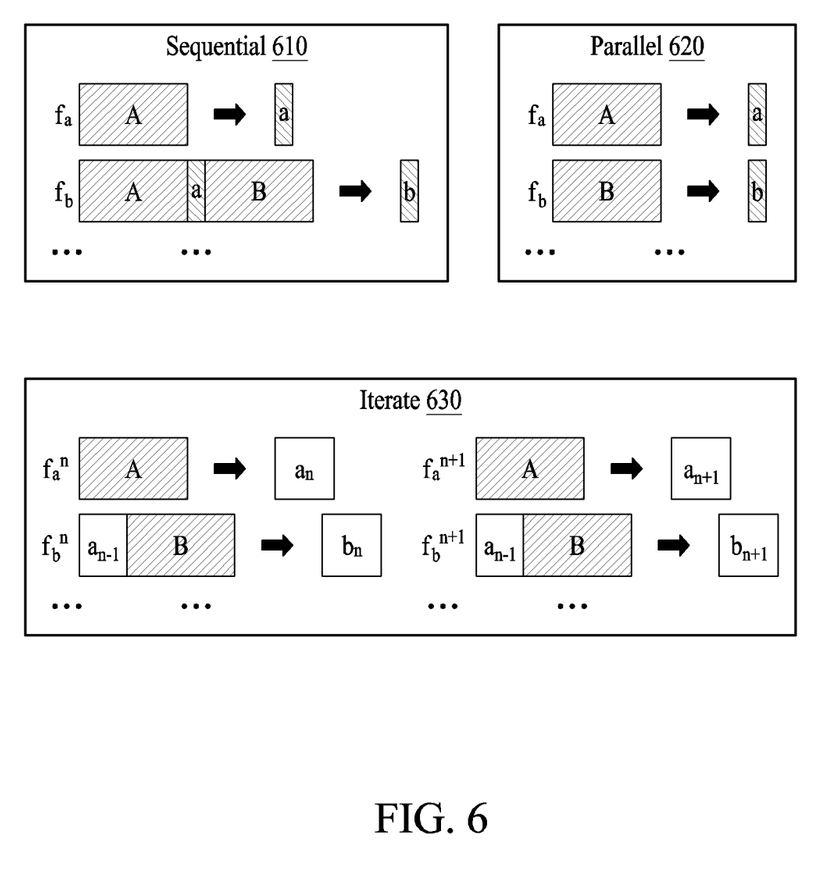
FIG. 6 illustrates an example of a method of individually training each sub-model.

FIG. 6 illustrates an example of a method of individually training each sub-model.

Referring to FIG. 6, sub-models may not all need to be trained at once, and each sub-model may be trained individually. However, when each sub-model is individually trained, an individual sub-model may need to be trained multiple times because output data of each sub-model in previous steps may not be obtained in real time.

In an example, when training a sub-model, a sequential training method 610 may include training using all data from previous sub-models of the sub-model. In another example, when training a sub-model, a parallel training method 620 may include training using only data of the sub-model. Although the sequential training method 610 may reflect a correlation of the production process compared to the parallel training method 620, a great amount of time may be needed to train the sub-model by the sequential training method 610 because the training of the sub-model is based on all sets of data.

In yet another example, an iteration training method 630 may use predicted third data obtained from sub-models from the previous steps in an nth or n−1th iteration of the sub-model.

Figure 7:
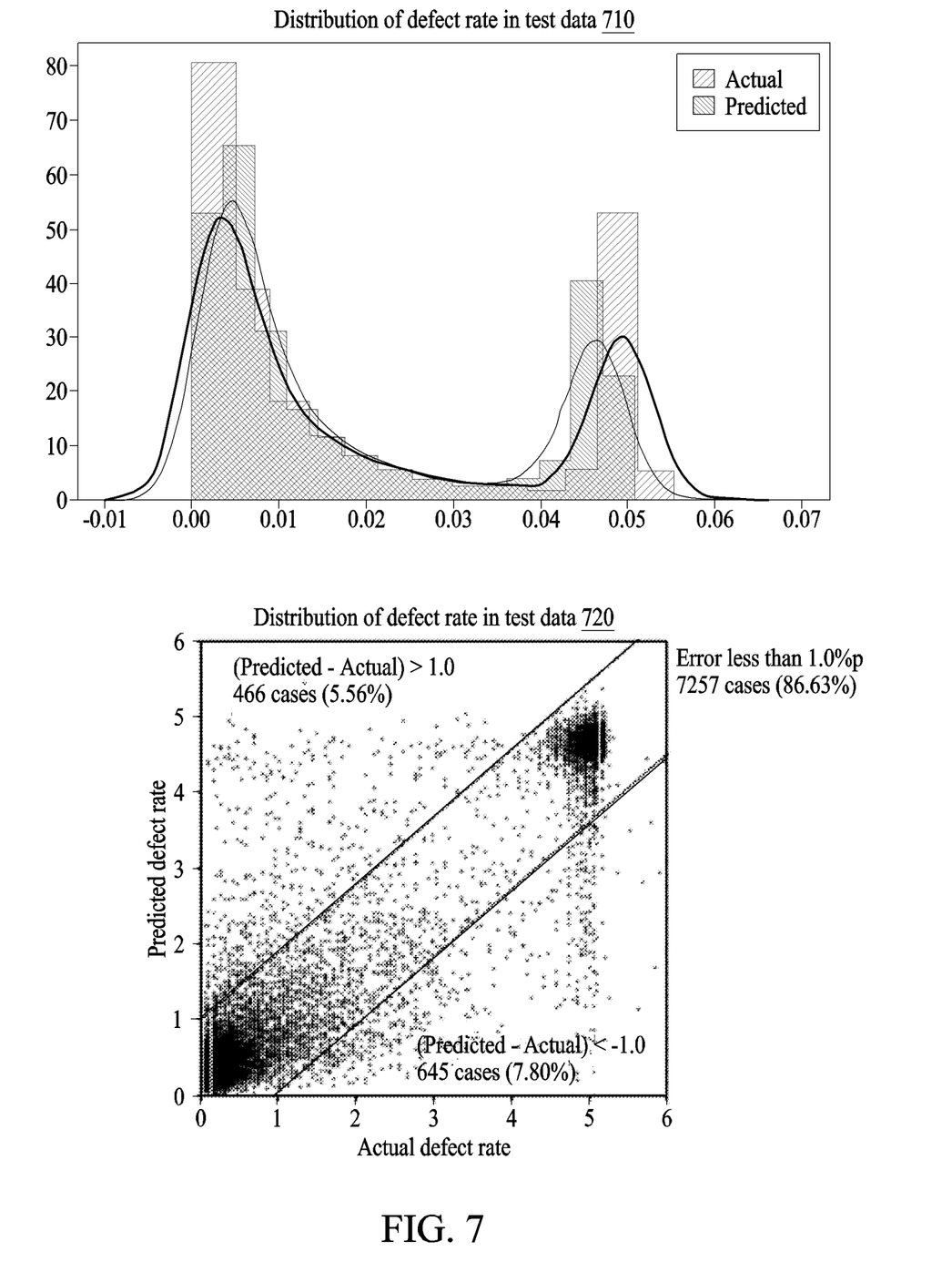
FIG. 7 illustrates an example of a graph comparing defect data predicted through a defect prediction method and actual defect data.

FIG. 7 illustrates an example of a graph comparing defect data predicted through a defect prediction method and actual defect data.

Referring to FIG. 7, a graph 710 may compare a defect rate of defect data predicted through a defect prediction method and a defect rate of actual defect data in a dynamic random-access memory (DRAM) production process. An x-axis of the graph 710 may indicate a defect rate represented between 0.0-1.0 (=100%), and a y-axis may indicate a frequency histogram. A section represented as a curve may be a probability density function using a kernel density estimation (KDE).

A graph 720 may represent a defect rate distribution of a defect rate of predicted defect data and a defect rate of actual defect data. An x-axis of the graph 720 may indicate a defect rate of the actual defect data, and a y-axis of the graph 720 may indicate a defect rate of the predicted defect data.

Referring to the graph 720, the defect rate of the defect data predicted in all cases may be 86.63% of the cases in which a difference between the defect rate of the actual defect data is less than 1%.

Figure 8:
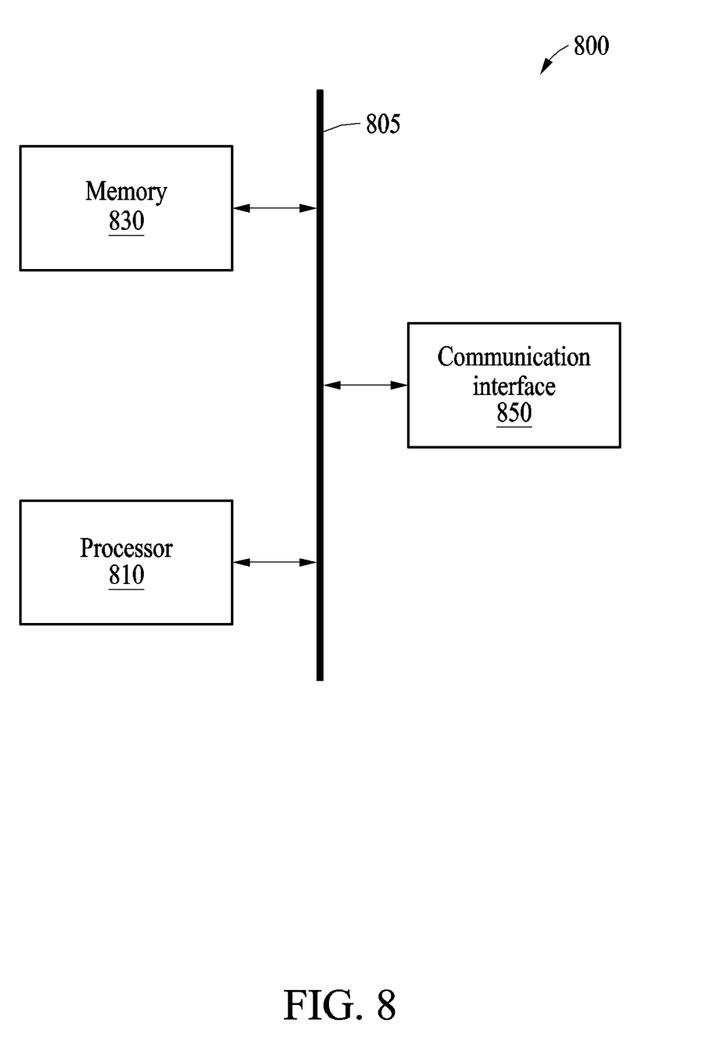
FIG. 8 illustrates an example of a defect prediction device.

FIG. 8 illustrates an example of a defect prediction device.

Referring to FIG. 8, a defect prediction device 800 may include a processor 810. The defect prediction device 800 may further include a memory 830 and a communication interface 850. The processor 810, the memory 830, and the communication interface 850 may communicate with one another through a communication bus 805.

The processor 810 may model a production process as a plurality of sub-models to determine a sequence between the plurality of sub-models, map production process data to each sub-model, and determine, by a corresponding sub-model, output data including defect information on a potential defect occurring in a corresponding step, for each of the plurality of sub-models, and predict information associated with a defect in the production process based on the output data to each of the plurality of sub-models.

The memory 830 may store production process data. The memory 830 may be a volatile memory or a non-volatile memory.

The processor 810 may perform at least one method described above or an algorithm corresponding to the at least one method with reference to FIGS. 1 through 7. The processor 810 may execute the program and control the defect prediction device 800. A program code to be executed by the processor 810 may be stored in the memory 830. The defect prediction device 800 may be connected to an external device (e.g., a PC or a network) through an input/output device (I/O) (not shown) and exchange data. The defect prediction device 800 may be provided in various computing devices and/or systems such as a smart phone, a tablet computer, a laptop computer, a desktop computer, a TV, a wearable device, a security system, a smart home system, and the like.

The device for predicting a defect, and other devices, apparatuses, units, modules, and components described herein with respect to FIGS. 1-8 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented defect prediction method, comprising:
    determining a sequence, being a sequential order of execution of a plurality of sub-models, by modeling a production process into the plurality of sub-models;
    mapping production process data into each of the plurality of sub-models;
    determining, by a corresponding sub-model, output data comprising defect information on a potential defect occurring in a corresponding step based on predicted third data of the corresponding sub-model and measured third data, for each of the plurality of sub-models;
    predicting information associated with a defect in the production process based on the output data corresponding to each of the plurality of sub-models; and inputting the output data of each of the sub-models to a subsequent sub-model of the corresponding sub-model, based on the sequence.

2. The processor-implemented defect prediction method of claim 1, further comprising:
obtaining the production process data.

3. The processor-implemented defect prediction method of claim 1, wherein the production process data comprises any one of or any combination of:
first data measured as the production process is performed;
second data processed based on the first data; and
the measured third data measured to determine whether a defect is present.

4. The processor-implemented defect prediction method of claim 1, wherein the determining of the output data comprises:
receiving previous output data of a previous sub-model of the corresponding sub-model; and
determining the output data of the corresponding sub-model based on the previous output data and the production process data of the corresponding sub-model.

5. The processor-implemented defect prediction method of claim 4, wherein the determining of the output data of the corresponding sub-model comprises:
predicting the predicted third data of the corresponding sub-model based on the previous output data, first data of the corresponding sub-model, and second data of the corresponding sub-model; and
determining final third data based on the predicted third data and the measured third data.

6. The processor-implemented defect prediction method of claim 5, wherein the determining of the final third data comprises:
determining the measured third data to be the final third data in response to the measured third data being present; and
determining the predicted third data to be the final third data in response to the measured third data being absent.

7. The processor-implemented defect prediction method of claim 5, wherein the determining of the output data of the corresponding sub-model comprises:
generating latent space information of the corresponding sub-model based on the previous output data, the first data of the corresponding sub-model, and the second data of the corresponding sub-model; and
determining the output data based on any one of or any combination of the first data of the corresponding sub-model and the second data of the corresponding sub-model, the final third data, and the latent space information.

8. The processor-implemented defect prediction method of claim 1, wherein the mapping of the production process data into each of the plurality of sub-models comprises dividing the production process data based on steps.

9. The processor-implemented defect prediction method of claim 1, wherein the determining of the sequence comprises determining the sequence between the plurality of sub-models based on any one of or any combination of a temporal order and a physical correlation of the production process.

10. A non-transitory computer-readable storage medium storing instructions that, when executed by a processor, cause the processor to perform the defect prediction method of claim 1.

11. A defect prediction device, comprising:
a processor configured to:
determine a sequence, being a sequential order of execution of a plurality of sub-models, by modeling a production process into the plurality of sub-models,
map production process data into each of the plurality of sub-models, determine, by a corresponding sub-model, output data comprising defect information on a potential defect occurring in a corresponding step based on predicted third data of the corresponding sub-model and measured third data, for each of the plurality of sub-models, and
predict information associated with a defect in the production process based on the output data corresponding to each of the plurality of sub-models,
wherein the output data of each of the sub-models is input to a subsequent sub-model of the corresponding sub-model, based on the sequence.

12. The defect prediction device of claim 11, wherein the processor is configured to obtain the production process data.

13. The defect prediction device of claim 11, wherein the production process data comprises any one of or any combination of:
first data measured as the production process is performed;
second data processed based on the first data; and
the measured third data measured to determine whether a defect is present.

14. The defect prediction device of claim 11, wherein the processor is configured to:
receive previous output data of a previous sub-model of the corresponding sub-model; and
determine the output data of the corresponding sub-model based on the previous output data and the production process data of the corresponding sub-model.

15. The defect prediction device of claim 14, wherein the processor is configured to:
predict the predicted third data of the corresponding sub-model based on the previous output data, the first data of the corresponding sub-model, and the second data of the corresponding sub-model; and
determine final third data based on the predicted third data and the measured third data.

16. The defect prediction device of claim 15, wherein the processor is configured to:
determine the measured third data to be the final third data in response to the measured third data being present; and
determine the predicted third data to be the final third data in response to the measured third data being absent.

17. The defect prediction device of claim 15, wherein the processor is configured to:
generate latent space information of the corresponding sub-model based on the previous output data, the first data of the corresponding sub-model, and the second data of the corresponding sub-model; and
determine the output data based on any one of or any combination of the first data of the corresponding sub-model and the second data of the corresponding sub-model, the final third data, and the latent space information.

18. The defect prediction device of claim 11, wherein the processor is configured to divide the production process data based on steps.

19. The defect prediction device of claim 11, wherein the processor is configured to determine the sequence between the plurality of sub-models based on any one of or any combination of a temporal order and a physical correlation of the production process.

* * * * *